(12) United States Patent
    Allison

(10) Patent No.: US 12,565,338 B1
(45) Date of Patent: Mar. 3, 2026

(54) BIDIRECTIONAL REGULATING HEAT PIPE NETWORK

(71) Applicant: Government of the United States as represented by the Secretary of the Air Force, Kirtland AFB, NM (US)

(72) Inventor: Jonathan Allison, Albuquerque, NM (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 0 days.

(21) Appl. No.: 18/116,286

(22) Filed: Mar. 1, 2023

(51) Int. Cl.
    *B64G 1/50* (2006.01)
    *F28D 15/04* (2006.01)

(52) U.S. Cl.
    CPC ............. *B64G 1/506* (2013.01); *F28D 15/04* (2013.01)

(58) Field of Classification Search
    CPC ................................ B64G 1/506; F28D 15/04
    See application file for complete search history.

(56) References Cited

U.S. PATENT DOCUMENTS

| | | | | |
|---|---|---|---|---|
| 2,499,736 A | * | 3/1950 | Erland | F25D 3/005 |
| | | | | 62/119 |
| 3,450,195 A | * | 6/1969 | Schnacke | B64G 1/50 |
| | | | | 165/47 |
| 3,490,718 A | * | 1/1970 | Vary | B64G 1/503 |
| | | | | 165/47 |

| | | | | |
|---|---|---|---|---|
| 3,749,156 A | * | 7/1973 | Fletcher | B64G 1/503 |
| | | | | 165/47 |
| 3,776,305 A | * | 12/1973 | Simmons | F28D 15/06 |
| | | | | 165/41 |
| 3,831,664 A | * | 8/1974 | Pogson | F28D 15/04 |
| | | | | 62/333 |
| 3,958,627 A | * | 5/1976 | Edelstein | F28D 15/06 |
| | | | | 165/104.26 |
| 3,968,787 A | * | 7/1976 | Basiulis | A47J 37/067 |
| | | | | 99/422 |
| 4,073,284 A | * | 2/1978 | Laing | F24S 80/50 |
| | | | | 126/618 |
| 4,162,701 A | * | 7/1979 | Ollendorf | G05D 23/24 |
| | | | | 165/274 |
| 4,324,375 A | * | 4/1982 | O'Neill | F28F 1/00 |
| | | | | 165/76 |
| 4,402,358 A | * | 9/1983 | Wolf | F28F 13/00 |
| | | | | 257/E23.088 |
| 4,420,035 A | * | 12/1983 | Hewitt | B64G 1/503 |
| | | | | 165/41 |

(Continued)

FOREIGN PATENT DOCUMENTS

| | | | | | |
|---|---|---|---|---|---|
| EP | 0438938 B1 | * | 2/1995 | ............... | B64G 1/54 |
| WO | WO-0068630 A1 | * | 11/2000 | ......... | H05K 7/20336 |

*Primary Examiner* — Ljiljana V. Ciric
(74) *Attorney, Agent, or Firm* — AFNWC/JA; David L. Narciso, Sr.

(57) ABSTRACT

A bidirectional regulating heat pipe network for a spacecraft payload temperature regulating system includes a payload having a thermal interface surfaces connected to a cool environment variable conductance heat pipe (CEVCHP) evaporator and a warm environment variable conductance heat pipe (WEVCHP) condenser to enable regulation of heat flow in or out of the payload in order to maintain a temperature within the payload's requirements.

15 Claims, 1 Drawing Sheet

(56)        References Cited

U.S. PATENT DOCUMENTS

| | | | | | |
|---|---|---|---|---|---|
| 4,583,587 | A | * | 4/1986 | Alario | F28D 15/0233 |
| | | | | | 165/41 |
| 4,706,740 | A | * | 11/1987 | Mahefkey | B64G 1/506 |
| | | | | | 165/41 |
| 4,830,097 | A | * | 5/1989 | Tanzer | F28D 15/046 |
| | | | | | 165/41 |
| 4,832,113 | A | * | 5/1989 | Mims | B64G 1/503 |
| | | | | | 165/41 |
| 4,899,810 | A | * | 2/1990 | Fredley | F28F 1/14 |
| | | | | | 165/41 |
| 4,974,668 | A | * | 12/1990 | Blackmon | B64G 1/50 |
| | | | | | 165/104.31 |
| 5,036,905 | A | * | 8/1991 | Eninger | B64G 1/506 |
| | | | | | 244/172.6 |
| 5,069,274 | A | * | 12/1991 | Haslett | B64G 1/503 |
| | | | | | 165/274 |
| 5,113,659 | A | * | 5/1992 | Baker | F03G 6/071 |
| | | | | | 60/659 |
| 5,267,605 | A | * | 12/1993 | Doty | B64G 1/503 |
| | | | | | 165/41 |
| 5,332,030 | A | * | 7/1994 | Spencer | F28D 15/0275 |
| | | | | | 165/41 |
| 5,372,183 | A | * | 12/1994 | Strickberger | B64G 1/503 |
| | | | | | 165/41 |
| 5,669,584 | A | * | 9/1997 | Hickey | B64G 1/50 |
| | | | | | 244/171.7 |
| 5,816,313 | A | * | 10/1998 | Baker | F28D 15/043 |
| | | | | | 165/41 |
| 5,954,298 | A | * | 9/1999 | Basuthakur | B64G 1/503 |
| | | | | | 165/41 |
| 6,073,888 | A | * | 6/2000 | Gelon | B64G 1/50 |
| | | | | | 165/104.31 |
| 6,511,021 | B1 | * | 1/2003 | Keramidas | B64G 1/503 |
| | | | | | 244/171.8 |
| 6,675,887 | B2 | * | 1/2004 | Garner | F28D 15/06 |
| | | | | | 165/274 |
| 6,854,510 | B2 | * | 2/2005 | Low | B64G 1/506 |
| | | | | | 165/41 |
| 8,096,512 | B2 | * | 1/2012 | Russell | B64G 1/66 |
| | | | | | 244/159.4 |
| 8,240,612 | B2 | * | 8/2012 | Jondeau | F28D 15/0275 |
| | | | | | 244/171.7 |
| 9,091,489 | B2 | * | 7/2015 | Morin | F28F 1/22 |
| 9,352,855 | B2 | * | 5/2016 | Wong | B64G 1/44 |
| 9,352,856 | B1 | * | 5/2016 | Wu | B64G 1/503 |
| 9,429,371 | B2 | * | 8/2016 | Morin | F28F 1/22 |
| 9,745,083 | B2 | * | 8/2017 | Smith | B64G 1/58 |
| 9,828,116 | B1 | * | 11/2017 | Mena | B64G 1/506 |
| 9,902,507 | B2 | * | 2/2018 | Walker | B64G 1/503 |
| 9,962,798 | B2 | * | 5/2018 | Morin | F28D 15/00 |
| 10,365,670 | B2 | * | 7/2019 | Swint | F28D 21/00 |
| 10,392,135 | B2 | * | 8/2019 | Smith | B64G 1/506 |
| 10,457,425 | B2 | * | 10/2019 | Aston | B64G 1/425 |
| 11,009,297 | B2 | * | 5/2021 | Smith | B64G 1/503 |
| 11,393,356 | B2 | * | 7/2022 | Kim | G09B 23/06 |
| 11,486,652 | B2 | * | 11/2022 | Huang | F28D 15/046 |
| 2025/0126693 | A1 | * | 4/2025 | Coleman | G01S 7/4815 |
| 2025/0250033 | A1 | * | 8/2025 | Allison | F28D 15/04 |

* cited by examiner

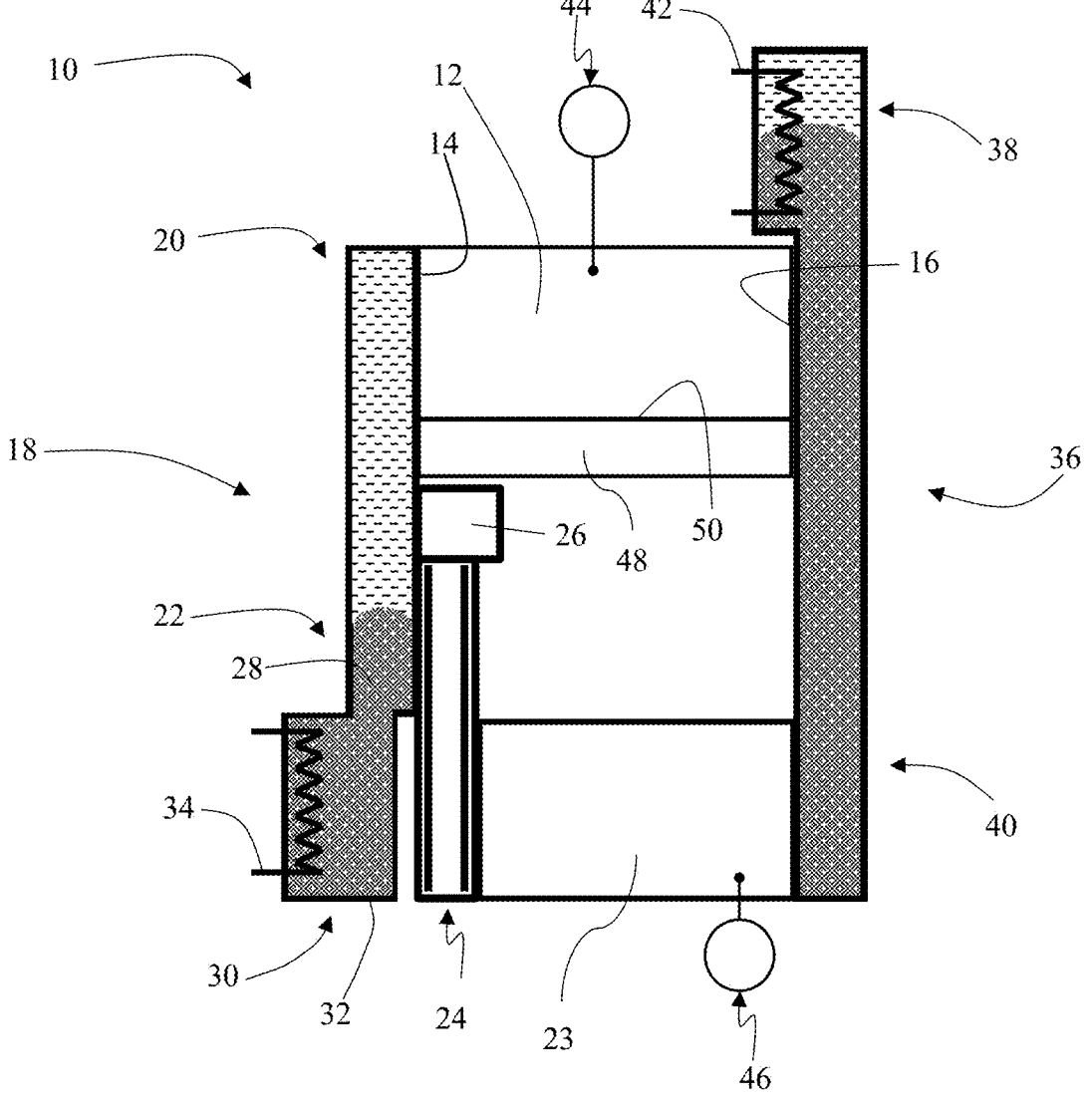

BIDIRECTIONAL REGULATING HEAT PIPE NETWORK

RIGHTS OF THE GOVERNMENT

The invention described herein was made by an employee of the United States Government and may be manufactured and used by or for the Government of the United States for all governmental purposes without the payment of any royalty.

Pursuant to 37 C.F.R. § 1.78(a)(4), this application claims the benefit of and priority to prior filed Provisional Application Ser. No. 63/315,282, filed Mar. 1, 2022, which is expressly incorporated herein by reference.

FIELD OF THE INVENTION

The present invention relates generally to spacecraft thermal control systems, and more particularly to systems for regulating payload temperatures using heat pipes.

BACKGROUND OF THE INVENTION

Spacecraft designers frequently struggle with how to manage heat flows amongst various parts of the spacecraft. The nature of the space environment means that various required operating scenarios affect which direction heat is inclined to flow and whether or not this is desirable. This can be compounded as spacecraft today are increasingly often an amalgam of major assemblies built by multiple different entities, sometimes interchangeably, which makes interface heat transfer control difficult. This can lead to undesirable alternatives such as excessively large batteries to provide heater power and other systems to provide cooling to enable spacecraft thermal control. Heat Regulation is a task in thermal engineering in which the amount of heat in an object and the rate at which heat flows between that object and its surroundings is regulated in such a way as to achieve a desired temperature for that object within some bounded range of acceptable temperatures. There are many nuances to the task of Heat Regulation that can make one technology or another preferable in different situations. Heat Regulation Technologies (HRTs) can be categorized by the degree of capability in Heat Regulation that they offer.

First, the tasks of spacecraft thermal control will be elucidated to explain Heat Regulation, in context. The tasks are: Heat Acquisition, Heat Collection, Heat Transport, Heat Rejection, Heat Provision (storage), Heat Insulation, and Heat Regulation. Heat Acquisition, Collection, Transport, and Rejection focus on taking uncontrolled thermal dissipation (generated heat) from its point of generation to the ultimate space sink. Heat Provision provides time-phasing to deal with thermal transients. Heat Insulation keeps environmental heat loads from overwhelming the thermal control system, and lastly, Heat Regulation permits the thermal control system to adjust its thermal connection to the environment to solve issues such as excessive heat loss in cold environments or excessive environmental heat absorption in hot environments. Heat Regulation can be seen as a capability to combine the tasks of Heat Insulation and Heat Rejection as needed throughout the mission. The Heat Regulation task may be characterized by its level of required temperature precision: many payloads are satisfied enough to stay within a 50 C operational band, while some sensitive science instruments require sub-millikelvin precision.

There are a variety of insufficient existing solutions to the task of Heat Regulation. The first, and default solution, may be said to be a 'cold biased' radiator+heaters+batteries+ feedback control. 'Cold biased' is an awkward way of saying that the design is intended to provide a cool-enough temperature in the hot environment and that heater power with feedback control maintains a satisfactory temperature on the thermal radiator. This is the most common form of Heat Regulation and is applied on most thermal radiators on practically every spacecraft. However, this solution provides no hot-side protection and sometimes requires excessive heater power which is usually the stimulus to consider alternatives.

A second solution, Thermal Capacitors, which includes both simple thermal masses (often Beryllium blocks) and phase change materials (PCMs) which use their heat of fusion to provide/store heat over melt/freeze cycles. Thermal Capacitors can be used to provide either hot-side or cold-side protection or both. These tend to be too heavy for all but small/local applications.

Thermal switches are a third solution. Thermal switches carry a penalty of excessive thickness in the thermal stackup as well as tending to be too heavy for widespread application. They also have moving parts which makes them unreliable. Thermal switches are only suited for local, niche applications and have not had much acceptance in recent decades.

Louvers are a known, but somewhat uncommon solution that tends to be used on outer solar system probes and some earth orbiting spacecraft of the 1980's. Louvers tend to be heavy and their moving parts make them unreliable. However, they've seen a small recent resurgence due to their ability to adjust the effective emissivity of the thermal radiators, thereby providing Heat Regulation to the entire thermal stackup.

Variable Emissivity Materials (VEMs) provide the prospect of a radiator thermo-optical coating that can change emissivity in response to temperature or electrical inputs. VEMs offer the value of louvers (Heat Regulation of the entire thermal stackup) without the moving parts (unreliability, mass). VEMs are under development but are still an immature technology as the challenges of achieving complicated active materials in the formidable space environment still must be overcome.

Pumped Fluid Loops (PFLs) with bypass lines and thermostatic valves are another solution. This is a quite popular Heat Regulation solution for both human and robotic missions. However, PFLs have terrible reliability: an open-source analysis found that PFLs have a 14% failure rate; failures ranged from mission degradation to requiring major replacements to near fatalities. NASA's robotic mission experience with such PFLs has been much more reliable than human spaceflight (MER Opportunity famously exceeded its design life by 55×), which is attributed to their less complicated design than PFLs for human spaceflight. PFL unreliability causes tend to be related to unexpected/ undesigned-for debris contamination (and thermostatic valves are complicit with the debris in this type of problem) or issues with pump package design. PFLs are not recommend because they are heavy, expensive, complicated, long lead, serial spacecraft assembly time, etc. There are better alternatives.

Loop Heat Pipes (LHP) with heater feedback control of the compensation chamber (CC) enable precise Heat Regulation over limited environments. Environmental range capabilities can be extended via dedicated thermal radiators for the CC and/or using thermoelectric coolers (TEC) on the CC to permit the LHP to operate at a lower operating temperature than it would otherwise tend to. This approach is cheaper and more reliable than PFLs but care must be taken with the design of an LHP's thermodynamics and novel LHP designs pose some risk in this area.

Variable conductance heat pipes (VCHPs) can provide cold-side Heat Regulation. VCHPs are like normal constant conductance heat pipes (CCHPs) except that they have an additional charge of a non-condensible gas (NCG). The NCG normally resides in a gas reservoir bottle but in cold environments, when the heat pipe fluid's vapor pressure decreases, the NCG's pressure (governed, to first order, by the ideal gas law) decreases, but not as rapidly as the heat pipe fluid. This causes the NCG to grow into the space of the condenser and can be used to partially or fully block the condenser and provide large turndown ratios in cold environments. VCHPs can be made in many types, the most common forms are uncontrolled VCHPs with wicked cold reservoirs, heater feedback controlled VCHPs with wicked cold reservoirs, and heater feedback controlled VCHPs with unwicked hot reservoirs. The former described VCHP types are simpler (i.e. cheaper and more reliable) but have less control authority whereas the latter described types are more complicated (i.e. more expensive, more development risk) and have greater control authority. Heater feedback controlled VCHPs with wicked cold reservoirs are the most common type of VCHPs in use today, these may also be called FCHPs to provide precision in communication. In general, larger reservoirs enable greater control authority but even infinitely large reservoirs can only provide a finite degree of control authority. Most VCHPs in use today are used for rather tight temperature control situations to provide passive thermal control to temperature sensitive payloads. VCHPs cannot provide hot-side Heat Regulation and thus are usually paired with an oversized radiator.

Diode heat pipes (DHPs) can provide hot-side Heat Regulation. Several types of DHPs exist, two common types are liquid trap DHPs (LTDHP) and gas reservoir DHPs (GRDHP). LTDHPs have a liquid trap attached to the end of the evaporator that can contain the entire fluid inventory of the heat pipe. If heat flow goes from the nominal condenser to the nominal evaporator then the liquid tends to all collect in the liquid trap where it cannot proceed back into the rest of the heat pipe, thus 'burning out the heat pipe' and preventing any further retrograde heat transfer. When heat flow in the prograde direction resumes, the liquid in the liquid trap evaporates, moves to the nominal condenser, condenses, and regular heat pipe operation resumes. GRDHPs function by having a gas reservoir similar to VCHPs where the gas reservoir contains enough gas that if retrograde heat transfer occurs, the gas will be swept to the nominal evaporator where it blocks the nominal evaporator and prevents retrograde heat transfer (or to be specific, dramatically reduces it by forcing condensation to happen in the nominal adiabatic section and then the heat must conduct through the heat pipe wall, which acts as a choke). DHPs are quite rarely used, being used only on 2 flight experiments and 3 spacecraft to the author's knowledge. All known flight experiments and spacecraft applications of DHPs have been LTDHPs. DHPs cannot provide cold-side Heat Regulation.

Since VCHPs and DHPs provide complementary functions, it would make sense to pair these technologies to achieve full-spectrum Heat Regulation. To the author's knowledge, this has only been done once: on the Clementine lunar space probe. This was done successfully. Pending patent application Ser. No. 17/824,893 for Thermomodulating Heat Pipe (TMHP), incorporated in its entirety by reference, sought to combine the capabilities of VCHPs and DHPs into the same heat pipe to provide passive heat regulation. TMHP can be an effective passive solution provided that heat transfer is only ever desired in a single direction. If bidirectional heat transfer capability is required, then a different solution is required. PFLs, as mentioned earlier, can provide bidirectional heat regulation, however PFLs incur huge size, mass, power, complexity, cost, lead time, manhours, and reliability impacts to the entire program. A bidirectional HRT that requires minimal resources is desired.

Thus, 10 different existing technologies to achieve Heat Regulation have been presented alongside their disadvantages in the context of the need at hand. When considering the array of technologies available to the field of spacecraft thermal control, it is clear that some of the tasks of spacecraft thermal control are better served by existing technologies than others. The task of Heat Regulation is particularly poorly served by existing technologies due to its difficult nature of keeping the temperature from becoming either too hot or too cold, which creates a surprising number of additional performance metrics and challenges beyond that experienced by simpler thermal tasks such as Heat Rejection and Heat Insulation where performance is not measured in terms of precision but in terms of magnitude.

SUMMARY OF THE INVENTION

The present invention overcomes the foregoing problems and other shortcomings, drawbacks, and challenges of spacecraft heat regulation by providing a Bidirectional Regulating Heat Pipe Network (BRHPN). A BRHPN is a new spacecraft thermal control subsystem (TCS) technology that can provide for heat regulation of payloads that may require the need to both receive and reject heat from their environment (e.g. another part of the spacecraft such as a thermal radiator or a mounting ring) at different times depending on the phase of the mission. A BRHPN must have 3 key features: 1) it must regulate heat transfer into and out of the payload to achieve a designed payload setpoint temperature, 2) it must permit heat flow in either direction to accomplish this regulated heat transfer, and 3) it must store the payload's heat if that heat cannot be immediately rejected due to too-hot environment. Such a BRHPN is feasible as its component technologies are all space-qualified. The BRHPN claimed includes new combinations of technologies to achieve previously unavailable and under-appreciated capabilities.

BRHPN provides a high level of Heat Regulation capability while only consuming a moderate level of resources, specifically, the same resources that are incurred today using state-of-the-practice HRT with only a moderate level of capability.

More particularly, the BRHPN provides the ability for a payload to both give and receive heat to its environment without resorting to the common, yet wasteful, approach of providing oversized thermal radiators, heaters, and very much heater power (and thus a large electrical power subsystem) in order to provide 'make-up' power to bring both the payload and its radiator to the payload's desired temperature—this is known as a 'cold biased' design. Today's conventional use of VCHPs, as feedback-controlled VCHPs (FCHPs) is a step in the right direction to solve this problem because it permits heat flow out of the payload to be regulated, thus reducing heater power demand substantially. However, today's FCHPs are not designed to accommodate (much less regulate) heat transfer into the payload, should that be necessary. Most FCHPs designs still use an oversize radiator, though they avoid the high heater power demands of the more common cold biased design. This use of FCHPs is all well and good, but some designs may actually require a payload to receive heat from its attached environmental object (henceforth referred to as the 'environmentally connected hardware', ECHW) at some phases of the mission. Existing FCHP designs do not permit this.

There are many applications that could benefit from this capability to transfer heat into the payload that the FCHP lacks. The application that motivated the development of this invention is a need for a payload attached to a launch ring via a standardized interface. In this application, the payload needs to reject heat into the ring during normal operation, but during orbit raising the payload tends to run quite cold while the ring runs hot. Additionally, during orbit raising, electrical power is extremely expensive since the solar arrays are stowed which means that all electrical power must come from batteries. To make matters worse, this orbit-raising case, and the heater power demand from the payload during this case, threaten to 'size' the battery, meaning that this is the greatest use-case for the battery and will define how big the battery must be for the entire mission. Furthermore, this threatens to oversize the batteries far more than are required by other cases. Thus, a means to provide bidirectional heat regulation is required.

While the invention will be described in connection with certain embodiments, it will be understood that the invention is not limited to these embodiments. To the contrary, this invention includes all alternatives, modifications, and equivalents as may be included within the spirit and scope of the present invention.

In one embodiment, the BRHPN provides a spacecraft payload temperature regulating system for a payload having a first thermal interface surface and a second thermal interface surface. A cool environment variable conductance heat pipe (CEVCHP) has an evaporator thermally connected to the payload first thermal interface surface and has a condenser thermally connected to environment-coupled hardware (ECHW) through a diode heat pipe (DHP). The DHP includes a liquid trap. The CEVCHP contains a noncondensable gas (NCG) slug in a cold end of the CEVHCP, and a NCG reservoir has a heater for use as needed to stop operation of the CEVCHP when appropriate. A warm environment variable conductance heat pipe (WEVCHP) has a condenser thermally connected to the payload second thermal interface surface and has an evaporator thermally connected to the ECHW. The WEVCHP also has a heater for use as needed to stop WEVCHP operation. The BRHPN also has a payload temperature sensor and an ECHW temperature sensor to provide signals to a control software that, when needed, powers either the WEVCHP heater or the CEVCHP NCG reservoir heater.

In another embodiment, the BRHPN includes a thermal energy storage unit thermally connected to a payload third thermal interface surface.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 is a schematic diagram showing a Bidirectional Regulating Heat Pipe Network (BRHPN).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

FIG. 1 is a schematic diagram showing a Bidirectional Regulating Heat Pipe Network. This embodiment may be described as a network of connections amongst various thermal objects that creates a thermal flow network, in the same way that an electrical flow network can be used to describe how electronics function within an electrical circuit. In order to understand the elements and their function, the objects which exist for purposes other than thermal management are described below.

In one embodiment, the BRHPN provides a spacecraft payload temperature regulating system 10 for a payload 12 having a first thermal interface surface 14 and a second thermal interface surface 16. A cool environment variable conductance heat pipe (CEVCHP) 18 has an evaporator 20 thermally connected to the payload first thermal interface surface 14 and has a condenser 22 thermally connected to environment-coupled hardware (ECHW) 23 through a diode heat pipe (DHP) 24. The DHP 24 includes a liquid trap 26. The CEVCHP 18 contains a noncondensable gas (NCG) slug 28 in a cold end 30 of the CEVHCP 18, and a NCG reservoir 32 has a heater 34 for use as needed to stop operation of the CEVCHP 18 when appropriate. A warm environment variable conductance heat pipe (WEVCHP) 36 has a condenser 38 thermally connected to the payload second thermal interface surface 16 and has an evaporator 40 thermally connected to the ECHW 23. The WEVCHP 36 also has a heater 42 for use as needed to stop WEVCHP 36 operation. The BRHPN also has a payload temperature sensor 44 and an ECHW temperature sensor 46 to provide signals to a control software that, when needed, powers either the WEVCHP heater 42 or the CEVCHP NCG reservoir heater 34.

In another embodiment, the BRHPN includes a thermal energy storage unit 48 thermally connected to a payload third thermal interface surface 50.

The payload (P/L)—the payload Generates heat sometimes but the Heat generation cycle is not necessarily coinciding with the thermal environment The Environmentally Coupled Hardware (ECHW)—this may be a thermal radiator or a piece of spacecraft structure (such as a mounting ring) that acts as an erstwhile thermal radiator, even though non-thermal members of the spacecraft design team might not think of it as such. The ECHW is spacecraft hardware on the P/L's primary heat path (i.e. the way heat leaves the P/L). Due to exigencies of the spacecraft mission design, the ECHW is sometimes during the mission both hotter and colder than P/L, and at different times the P/L both needs to reject or to receive heat from the ECHW. If the ECHW is always cooler than the P/L then a simpler FCHP design should be chosen, if the ECHW is always hotter than the P/L then the P/L will need to find an alternative thermal path to sink its heat and should be thermally isolated from the ECHW and the BRHPN should also not be used in this case. The ECHW may be a thermal radiator or something attached to a thermal radiator In this embodiment there are two alternative paths through which heat may travel through the BRHPN: the cold environment path and the hot environment path. The cold environment path is the connectivity network of heat pipes within BRHPN through which heat is intended to flow when the environment is colder than the payload. Likewise for the hot environment. BRHPN is designed to insure that heat only flows through one of these paths at a time and that each path is designed to operate under the designated conditions in which it needs to operate. This is important because other alternatives that would be simpler in terms of topology or heat pipe design are not sufficient to accomplish everything BRHPN needs to do. A key to BRHPN's ability to operate is that it optimizes the heat pipes in the two paths so that no heat pipe is called on to do more than it can reasonably do.

The cold environment path's job is to regulate heat flow out of the payload when the payload is warmer than the environment. When the payload is cooler than the environment the cold environment path's job is to shut down. The cold environment path is substantially similar to the FCHP technology previously described and in regular use: the cold environment VCHP (CEVCHP) is thermally connected to the payload at the CEVCHP's evaporator and thermally connected to the ECHW at the CEVCHP's condenser, a reservoir is supplied to contain the NCG and which had plenty of volume relative to the condenser, the reservoir is allowed to run cold (i.e. at or slightly below the temperature of the condenser) and has a wick within it to communicate liquid back to the condenser, temperature sensor(s) on the payload are used to provide feedback to heaters on the reservoir that are adjusted to increase reservoir temperature to grow the NCG and thus block the condensation of vapor in the condenser and thus decrease the CEVCHP's conductance. The CEVCHP itself is fundamentally undifferent from existing FCHPs. However, one difference in the cold environment path is salient. One approach would be to connect the CEVCHP directly to the ECHW. However, the problem that occurs is that the NCG tends to take up vastly different amounts of volume depending on the temperature within the CEVCHP (or any other VCHP, for that matter). In order for the CEVCHP to properly regulate its heat flow when the environment is cold it needs to have a relatively low charge of NCG since NCG tends to consume much more volume in a VCHP at cold temperatures than at hot temperatures. Thus, when heat flows into the payload, the NCG will be next to the warmer payload and it will be too cold to act to block heat transfer as a gas diode heat pipe would do. Thus, a separate diode heat pipe (DHP) is required in the cold environment path to insure that the cold environment path is shutdown during hot environments when the hot environment path should be the only active path. This DHP is also already used in space, though much less frequently than FCHPs. DHPs have been used in a similar configuration as this cold environment path (i.e. in series with a VCHP) on the Clementine lunar mission in the 1990's. Nominally, a liquid trap DHP is proposed as that is the most common type of DHP and because it has good diodicity for its size and mass. More discussion about NCG and its role in VCHPs will be provided later when the particulars of BRHPN operation are discussed.

Heat pipes are also used in the hot environment path. The warm environment path's job is to regulate heat flow into the payload when the payload is cooler than the environment. When the payload is warmer than the environment the cold environment path's job is to shut down. There is only one heat pipe in this path, this is also a VCHP, we will call it the warm environment VCHP, WEVCHP. The WEVCHP is similar to the CEVCHP in that it has what is referred to as a cold, wicked reservoir (the reservoir is thermally coupled to the condenser and it has a wick that communicates liquid to and from the reservoir) but it is different in several ways: 1) The WEVCHP is installed 'backward' from the way that VCHPs normally are—indeed, the WEVCHP's job is to allow heat into the payload, so it must be installed backward, 2) because the reservoir on the WEVCHP tends to run at the payload's temperature which is warmer than the CEVCHP's temperature when it needs to operate (i.e. the ECHW temperature when the ECHW is colder than the payload) this means that the WEVCHP requires a larger NCG charge than the CEVCHP, 3) other knockon consequences of #2, might cause other differences between the design of the WEVCHP and CEVCHP, for example different reservoir sizes.

Control hardware is also a factor. FCHPs typically have one or more heaters on the reservoir and one or more temp sensors on the payload. The payload's temperature is fed into a computer which then adjusts reservoir heater power as previously described to achieve the payload's designed setpoint temperature. Similarly, on BRHPN, heaters are located on the reservoirs of both VCHPs and temperature sensors are provided on both the payload and ECHW. Temp sensor data is used to determine which direction heat is flowing (either to or from the payload and from or to the ECHW) and also to determine whether the payload is at an acceptable temperature. If the payload's temperature is not acceptable, heater power levels can be adjusted to provide heat regulation. This will be discussed in more detail later with pseudocode describing the control algorithm.

The last piece of hardware to describe is the thermal energy storage unit (TESU). The TESU can use phase change materials (PCM) which store thermal energy in the latent heat of phase transition of a material. Alternatively, the TESU can be a simple thermal capacitor which stores heat sensibly. A thermal capacitor can be either purpose-built or be harvested as an unused resource if a high thermal capacitance object such as a propellant tank can be recruited to double duty as a thermal capacitor. The design of the TESU must accommodate issues like total heat capacity, time-to-access that heat capacity, and other issues that are familiar to those skilled in the art of TESU design. PCM TESUs have a long history of flight experience.

Now that the components of the BRHPN have been described individually, along with a brief description of why they are needed, it is now time to discuss how these components work together in various scenarios to perform the overall function of regulating the payload's temperature in environments that can be either hotter or colder than the payload. The specific heat regulation capability that BRHPN provides is complicated in that it provides capability in a range of scenarios. This leads to numerous modes of operation that substantiate its usefulness. Six modes are defined and will be dealt with in a sequence that begins with a warming ECHW, continues to a hot ECHW, then a cooling ECHW, then a cold ECHW. Modes need not change in this order, however this sequence is a convenient way of description as following modes evolve out of the thermodynamic state of the previous modes in the sequence.

Mode 1: Warming the Payload with Environment-Coupled H/W

In some circumstances the payload needs to be warmed up and the ECHW is warmer so the ECHW's heat is used to warm up the payload. Mode 1 provides a means for heat transfer from ECHW to the payload. In this Mode, environmental heat loads, e.g. solar loading, cause the environment-coupled hardware (ECHW) to be warmer than the payload (P/L) & the warm environment VCHP (WEVCHP) is open. Thus, heat flows to the P/L. Heat flows through the WEVCHP, regulated by the NCG in the WEVCHP. WEVCHP heater may be either OFF or ON-if fast warmups are required then OFF, if slow warmups required then ON. When the P/L & especially the ECHW are warm, more power is needed to regulate. The DHP is placed in retrograde heat transfer direction so the cold side thermal path is almost entirely shut off. Mechanism: DHP's liquid is trapped in the liquid trap. The cold environment VCHP (CEVCHP) has minimal heat transfer since DHP is shut down. Note that the NCG charge in the WEVCHP is larger than in the CEVCHP; this is required since the reservoir of the WEVCHP needs to operate at a warmer temperature than that of the CEVCHP. This leads to the consequence that the CEVCHP's NCG is, in general, insufficient to block the CEVCHP, which is why the DHP is needed. Heat leaves the system by leaking from the P/L into the rest of the spacecraft or to space. To summarize, in this mode, BRHPN's behavior is like that of an FCHP installed backwards from the conventional arrangement, regulating heat flow into the payload.

Mode 2: Maintaining Payload Temperature in Warm Environment

In some circumstances, the payload is at a good temperature and is not generating any heat and the ECHW is warmer than the payload, in this case, it is desirable to limit heat transfer from the ECHW to the payload. In this Mode, environmental heat loads, e.g. solar loading, cause the environment-coupled hardware (ECHW) to be warmer than the payload (P/L) but the WEVCHP is closed. Heater power on the reservoir of the WEVCHP, in combination with being near the hottest design P/L temp cause the WEVCHP's NCG to expand & block the WEVCHP condenser. At higher temperatures, the NCG naturally consumes less volume. The highest ECHW & P/L temperatures at which BRHPN functions is defined by how hot the NCG can be and still block the condenser. This point can be enhanced with heater power & WEVCHP reservoir volume. The DHP is placed in retrograde heat transfer direction so this thermal path is almost entirely shut off. The cold environment VCHP (CE-VCHP) has minimal heat transfer since DHP is shut down. Substantially no heat transfers from ECHW to P/L so ECHW rejects heat back to space or other parts of the spacecraft. To summarize, in this mode, BRHPN's behavior is like that of a DHP preventing heat flow in.

Sometimes, a mode like Mode 2 happens, but the payload also needs to generate heat. In this case, the heat flow paths still need to be blocked but a means (TESU) for temporarily storing the payload's generated heat is also required. In this Mode, environmental heat loads, e.g. solar loading, cause the environment-coupled hardware (ECHW) to be warmer than the payload (P/L) but the WEVCHP is closed. WEVCHP, DHP, and CEVCHP are all operating in the same conditions as in Mode 2. However, now, there is heat generation within the P/L; this heat is stored in the Thermal Energy Storage Unit, TESU.

Mode 3: Storing Payload Heat During Warm Environment

The TESU is an optional part of the design but without it, the only available hot side Heat Regulation is the thermal capacitance of the P/L so Mode 3 has only a small capability in terms of heat storage and duration. Note that both the TESU, or the alternative, P/L thermal capacitance, only offer temporary heat storage—this isn't a steady-state capability to this mode. The design must insure that the Mode ends before the heat capacitance is consumed. Substantially no heat transfers from ECHW to P/L so ECHW rejects heat back to space or other parts of the spacecraft. To summarize, in this mode, BRHPN's behavior is like that of a TESU storing heat.

Mode 4: Rejecting Stored Heat in Cool Environment

After the warm environment of Mode 3 is complete, the heat must be rejected. In this Mode, heat stored in Mode 3 is now rejected. Mode 4 can only begin when the environment cools off (i.e. ECHW is cooler than P/L). Heat generation by the payload in this mode can occur but is not required. Thus heat flow direction reverses and NCG in both CEVCHP & WEVCHP switches sides. This reversal will take finite time. Heat stored in TESU is released back to the P/L. Reversal of heat flow direction causes: NCG to block evaporator of WECVHP, shutting it down, Liquid in the DHP's liquid trap is vaporized, moves to the DHP's condenser, condenses and is wicked to the DHP's evaporator, beginning prograde (i.e. nominal) DHP operation, and NCG to move to reservoir of CEVCHP thereby activating the CEVCHP. Heat can now flow from the P/L to the ECHW through the CEVCHP and DHP. The CEVCHP reservoir heater is nominally OFF as this mode represents a situation in which maximum heat transfer is desired in order to recharge the TESU as quickly as possible. However, the BRHPN can be designed/built to impose a slower cooldown time, if that is desired. This is done by partially closing the CEVCHP and slow down heat transfer. The ECHW rejects the heat to space or the spacecraft. To summarize, in this mode, BRHPN's behavior is like that of a TESU and/or a constant conductance heat pipe rejecting heat so as to reduce the payload's temperature.

Mode 5: Maintaining Payload Temp in Cold Environment

Sometimes that ECHW is cooler than the payload, the payload is cool enough, and the payload is generating no power or some power, in this case parasitic heat leaks into the payload from the rest of the spacecraft plus any power generated by the payload need to be rejected to space, but in a regulated way so that the payload does not cool off any further. In this Mode, environmental heat loads, e.g. eclipse, cause the environment-coupled hardware (ECHW) to be cooler than the payload (P/L) as in Modes 4 & 5. The WEVCHP is still blocked by its NCG. Less heat flows through the BHRPN than Modes 4 & 5—this is required in order to insure that the P/L does not undertemp. The requisite reduced heat flow is achieved by applying heat to the CEVCHP reservoir heater to partially close the CEVCHP condenser. The DHP operates in the prograde direction, permitting heat transfer from the P/L to the ECHW via the CEVCHP. The ECHW rejects the heat to either space or the spacecraft. To summarize, in this mode, BRHPN's behavior is like that of a feedback controlled heat pipe rejecting payload heat in a regulated manner so as to maintain the payload's temperature.

Mode 6: Shutdown in Cold Environment

Sometimes that ECHW is cooler than the payload, the payload is already cooler than it should be, and the payload is generating no power. In this case, it is desired that no heat would flow from the payload to the ECHW, as that would cool the payload down even further. In this Mode, environmental heat loads, e.g. eclipse, cause the environment-coupled hardware (ECHW) to be cooler than the payload (P/L) as in Modes 4 & 5. There is no payload dissipation. The WEVCHP is still blocked by its NCG. The CEVCHP's NCG grows enough to entirely block the CEVCHP's interface with the DHP. Thus, both heat flow paths are blocked and substantially no heat flows from the payload to the ECHW. The ECHW's temperature becomes much cooler than the payload as it seeks equilibrium with its cold thermal environment. To summarize, in this mode, BRHPN's behavior is like that of a diode heat pipe installed backward because it prevents heat flow out of the spacecraft (usually DHPs are used to prevent heat flow into the spacecraft during hot environment-DHPs cannot conventionally be installed in this backward direction because this would prevent heat flow out of the spacecraft which is necessary in some points of the mission-BRHPN solves this problem by providing a means to accomplish that in other Modes). In this way, Mode 6 does the best that it can to prevent heat loss from the cold payload to the even colder ECHW.

So, it has been shown that the BRHPN responds appropriately to any combination of situations where the payload is either too warm, too cold, or just right, and where the ECHW is either hotter or colder than the payload. The permutations of these possibilities ($2\times3=6$) presents 6 different environments requiring distinct responses from the BRHPN. Each of the 6 Modes defined herein responds appropriately to the 6 different environments that may be encountered.

Thus it has been shown that BRHPN can act like an FCHP (operating in either direction), a CCHP, a TESU, or a DHP (operating in either direction) as appropriate to the environmental circumstances. Thus, a BRHPN offers the maximum possible flexibility in operation that a heat pipe network can offer.

In situations where the ECHW and payload are substantially the same temperature, the NCG transitions between the two ends of each VCHP and the DHP occupies a hysteretic space where it will continue to do whatever it was doing immediately prior. In any case, with no temperature difference, there is no heat flow so the question of how much thermal conductance there is is moot because the lack of temperature difference means no heat transfer.

These 6 modes can be arranged in a 2×3 grid to convey their relationships. 3 columns signify whether the payload is too cold, just right, or too hot. 2 rows signify whether the ECHW is hotter than the payload or the other way around. Toggling between the 6 modes is not heavily constrained—the only constraint is that the payload cannot proceed directly between too cold and too hot without first being 'just right'. Of course, nothing prevents this transition from happening in a quick enough manner that the 'just right' mode only happens very briefly.

Next discussion of the means by which the BRHPN is controlled is in order. The BRHPN incorporated feedback controlled VCHPs (i.e. FCHPs). The CEVCHP is controlled as a conventional feedback-controlled VCHP. The payload is attached to the evaporator and its temperature is managed via feedback to the reservoir heater. This is familiar to those skilled in the art, and has considerable spaceflight history. In contrast, the WEVCHP is unconventional—it is also feedback controlled from the payload's temperature to the reservoir heater, but here the P/L attaches to the evaporator. Similar to a controlled reservoir temperature VCHP. Both VCHPs in BRHPN are unconventional in the sense that most feedback controlled VCHPs are not designed with retrograde temperature gradients in mind. This may lead to novel concepts in control algorithm and VCHP design.

The general means by which the BRHPN is controlled in order to achieve heat regulation of the payload in all environments considers heat transfer requirements. If reduced heat transfer is needed, then more heat should be applied to the VCHP whose reservoir currently has NCG in it. If less heat transfer is needed, then less heat should be applied to the VCHP whose reservoir currently has NCG in it. Heat should not be applied to the reservoir with liquid in it. There are many control logics that can be used to determine how much heater power is applied in response to a given temperature condition, these include bang-bang, proportional, and proportional/integral/derivative. Any of these control logics (and others) may be used here.

Pseudocode:

Initiation: Set heaters to OFF

Begin iterative loop in subsequent steps

Select MODE

If T_ECHW>T_PL+DT_NCG_DEADBAND then RUN: PROGRADE MODE % What to do if ECHW is hotter than payload If T_PL>T_ECHW+DT_NCG_DEADBAND then RUN: RETROGRADE MODE % What to do if payload is hotter than ECHW Else RUN TEMPERATE MODE % What to do if payload and ECHW are substantially the same If MODE from previous iterative loop is different than for this loop then turn OFF all HEATERS % don't leave heaters on if MODE changes Prograde Mode If T_PL>T_PL_MAX_ALLOW then increase power to WEVCHP_HEATER % if the payload is too hot while the payload is hotter than the ECHW then use the WEVCHP's reservoir heater to increase the WEVCHP's NCG size and reduce heat transfer from the ECHW to the payload If T_PL<T_PL_MIN_ALLOW then decrease power to WEVCHP HEATER % if the payload is too cold while the payload is hotter than the ECHW then decrease power on WEVCHP's reservoir heater so as to shrink the NCG and increase heat transfer from the ECHW to the payload Else: Repeat Loop starting at Step 2% If the payload's temperature is within the control deadband then leave it alone Retrograde Mode If T_PL<T_PL_MIN_ALLOW then increase power to CEVCHP_HEATER % if the payload is too cold while the payload is colder than the ECHW then use the CEVCHP's reservoir heater to increase the CEVCHP's NCG size and reduce heat transfer from the ECHW to the payload If T_PL>T_PL_MAX_ALLOW then decrease power to CEVCHP_HEATER % if the payload is too hot while the payload is hotter than the ECHW then decrease power on CEVCHP's reservoir heater so as to shrink the NCG and increase heat transfer from the ECHW to the payload Else: Repeat Loop starting at Step 2

Temperate Mode

Repeat Loop starting at Step 2% When NCG is shifting between the two sides, don't do anything Report out inputs, MODE, heater power status, temperatures Wait X seconds Repeat Loop starting at Step 2

Note that '%' signs indicate that everything following is a comment about how that line of pseudocode works.

This concludes the section discussing how the BRHPN works, next we will discuss ways in which it may be used.

Up to this point, the focus on how the components of BRHPN are connected topologically rather than physically. Some discussion of capabilities for physical implementation are now in order. First, it should be noted that the fundamental thermal control technologies comprising BRHPN all exist today and there are known ways of designing, building, and integrating these technologies that are known to those skilled in these arts. This include methods for making heat pipes, PCM units, means to thermally mount hardware, etc. This invention does not propose to change any of these and these are accordingly not mentioned here. However, some physical discussion of how BRHPN integrates to both the payload and the ECHW is in order. The heat pipes or BRHPN can include a pressure-containing bore with an incorporated wick within it and sealed at both ends. This bore can be bent in order to route the heat pipe through space. This can be useful to the BRHPN because it can allow BRHPN heat pipes to snake through space to give/receive heat with both the payload and the ECHW. This also means that non-flat surfaces can be accommodated, e.g. if the ECHW is a launch adapter ring, the heat pipes can be bent to match that ring's curvature. Bends can also be incorporated to deal with issues such as ground testability and mounting to the desired location on the hardware. All of this is familiar to those skilled in the art but is nonetheless discussed here in order to communicate that BRPHN does not impose any mounting constraints upon the spacecraft that are any different from typical, simple heat pipes.

An application of ESPA ring thermal management is described below. First, terms: ESPA (EELV Secondary Payload Adapter) Ring, EELV—Evolved Expendable Launch Vehicle.

The challenge: ESPA rings are popular ways to carry small payloads to space but sometimes ESPA payloads stay on the ring for the mission, sometimes not. If an ESPA ring has a long orbit raising duration (e.g. using an electric thruster) and the solar array must be stowed during this time, then power budgets are tightly strained. This might cause thermal designers to desire to thermally isolate the attachment between the ESPA payload and ring to minimize heat loss into the ring. However, in later phases of the mission, the ESPA ring might be required as a place to sink heat from the payload-conventional solutions are insufficient. The BRHPN solution is to thermally mount the payload to the ring via BRHPN. Then mechanically mount the payload to the ring via thermally isolating bolted joints. This way BRHPN can be used to manage heat transfer to prevent heat transfer during orbit-raising and permit heat transfer during normal operation The concept of operations for this application is to use and command the BRHPN on a mission mode basis: Pad & Launch mode: Ring & ESPA P/L temperatures both driven by pad air conditioner temperature, BRHPN doesn't matter here. Transfer Orbit mode: ESPA P/L and Ring are both cold, Minimize heat transfer from ESPA P/L to Ring, BHRPN shuts down heat transfer from cold ESPA P/L to colder Ring. On-Orbit mode: ESPA P/L is generating heat and needs to reject it, Maximize heat transfer from ESPA P/L to Ring, If/when Ring is cooler than ESPA P/L BHRPN permits heat transfer; if/when Ring is hotter than ESPA P/L then BHRPN shuts down heat transfer and any heat generated by ESPA P/L is shunted to thermal energy storage unit. Emergency Safehold mode: ESPA P/L is probably OFF and not dissipating, but needs to maintain setpoint temperature, BHRPN dynamically adjusts heat transfer between ESPA P/L to Ring to achieve ESPA P/L setpoint. Thus BHRPN regulates heat temperature of ESPA P/L by adjusting thermal conductance to Ring to meet ESPA P/L's needs.

Many other BRHPN applications have been identified:

ESPA payload mounting, where currently used solutions are poor-using heaters and multiple batteries.

Orbital labs, where a BRHPN would provide for a standardized thermal interface.

Precision temperature control of hosted payloads with minimal heater power.

Low Lunar Orbit, where a BRHPN could connect a payload to thermal radiators in a very difficult thermal environment-lots of hot and cold regions. Currently used solutions are poor, using heaters and requiring multiple batteries.

Thermal Regulation on Planetary Surfaces such as the moon or Mars.

Space probes, where a BRHPN could connect payload to thermal radiators, which is important for variable solar loading as a function of distance from sun. Currently used solutions are poor: louvers, pumped fluid loops.

Use of thermal radiators as thermal absorbers during orbit-raising to minimize heater power consumption. Turn the radiators into the sun to absorb heat, BHRPN allows heat into the payload to regulate its temperature despite not having much available electrical power since it is all being consumed by electric thrusters during orbit raising.

Battery thermal control subsystems (TCS) with widely varying thermal environments. A battery TCS with PCM energy storage needs to reject heat during battery discharge but not get too cold when the battery radiator comes into the sun-minimizes battery thermal cycling, radiator area, and heater consumption.

Propellant module TCS-prop modules need to be kept in tight temperature ranges but their environments can be both hotter and colder. A BRHPN attached to the prop panel to small, dedicated prop radiators/absorbers consisting of panels on the prop module. Orbital environments can provide heat input or output to the prop module, as required, to isothermalize the prop module.

Any other spacecraft hardware that needs to be maintained in a fairly tight temperature range and whose environments can be either hotter or colder than that temperature range.

BRHPN derives substantial heritage from the FCHP, mentioned earlier. It is instructive to compare BRHPN to a fairly common implementation of VCHPs: Feedback-controlled VCHPs (FCHPs). FCHPs were invented in the early 1970's, flight success shortly thereafter. FCHPs are an important influence on BHRPN. FCHP permits a payload to be cooled to an appropriate temperature by adjusting heat flow through the VCHP. Implicit in the FCHP scheme is the intent that heat flows from payload to the radiator. Some FCHPs will respond quite poorly if the heat flow direction reverses. FCHPs are not designed to prevent reverse heat flow, although some can accomplish this with some degree of capability. FCHPs definitely don't regulate heat flow in the reverse direction. Fundamentally, the FCHP concept does not include a desire to manage (or even permit) heat flow into the payload. This is clearly a different capability that BHRPN advances beyond FCHP implementations. FCHPs generally don't include a purpose-built thermal energy storage unit. Generally, TESUs are only needed in hot environments, which FCHPs aren't intended for.

Another interesting comparison of BRHPN to previous history is the comparison to the Advanced Thermal Control Flight Experiment (ATFE). ATFE was a 1975 flight experiment that was intended to demonstrate 3 new technologies: DHPs, PCM TESU, and FCHPs. ATFE had a clever design that used environmental heat to provide thermal power to test the FCHP & TESU while also getting a demonstration of the DHP out of it. In comparison to BHRPN, ATFE: has a separate absorber and radiator with different optical coatings that cause them to run at different temperatures. Heat flow is intended to be a continuous through process, rather than a back-and-forth (regenerative heat exchanger) process as in BRHPN. ATFE provides only crude hot-side regulation—the DHP only prevents backflow of heat, it does not regulate how much heat enters the payload. ATFE is intended for thermally connecting the payload to explicit radiators/absorbers rather than to any kind of EHCW as in BRHPN. ATFE is suited for managing a payload with dedicated views to space, as opposed to BRHPN which is suited to connect any payload to any EHCW regardless of space views.

It has already been noted that BRHPN is a combination of existing technologies, more detail about just how much heritage these technologies have is now in order. BRHPN is imminently feasible because all of its comprising tech is TRL 9 (i.e. has spaceflight experience). The novelty of BRHPN is in the combination of these techs to achieve a new capability. BRHPN's comprising technologies are: 1) Feedback-controlled VCHPs both controlling off heat acquisition side (typical VCHP use) and controlling off heat rejection side (less frequently used), 2) Diode Heat Pipes, Liquid trap proposed, other options available, these have successful spaceflight experience on several satellites: CSE & CRYOFD on Shuttle, Clementine, CRISM on MRO, MESSENGER, 3) Thermal Energy Storage Units with Phase Change Material: successful flight experience on Lunar Rover, ATS-6 ATFE, MESSENGER, NICER, 'LEO flight', others that are unmentionable, and Flight designs (either hasn't yet or didn't fly) for X-38 and Lunar Flashlight.

Some context for how BRHPN fits into the pantheon of other HRTs is now in order. HRTs can be characterized according to many metrics which makes it somewhat difficult to rank their capability on a single scale, however, for the sake of discussion, this was attempted. In general, simpler HRTs are more reliable, cheaper, lighter, draw less power, are quicker to procure, and offer less capability than more complicated HRTs. This allows a somewhat simplistic comparison of 'resource demand' vs capability, nevertheless this comparison has some utility in discussing new technologies which offer better capability than their resource demand might suggest.

At the simplest end of the spectrum, autonomous thermal regulation technologies require no input (power, command, or otherwise) to provide automatic control. DHPs, TMHPs, thermal capacitors, heat switches, louvers, and variable emissivity materials all fall in this category. Next, commandable heat input technologies, in particular oversized radiators with heaters, permit commandability but at a high power demand. Next, VCHPs allow regulated heat transfer but only in one direction and only with a single, built-in setpoint. Next, LHPs allow heat regulation with an adjustable setpoint but still only allow heat flow in one direction. Next, BHRPN allows heat regulation with heat flow in either direction but with a single, built-in setpoint. Next, PFLs allow bidirectional and setpoint-adjustable thermal regulation. Lastly, and at the apex of thermal regulation, cryocoolers (and potentially other refrigerators) allow heat to be moved against a thermal gradient, providing ultimate thermal regulation control.

Making the components of the BRHPN involve many issues.

First, the envelope material for the various heat pipes. Envelope material is selected based upon several criteria: fluid-envelope chemical compatibility, low thermal conductivity to minimize parasitic conduction between the condenser and evaporator, CTE-matched (coefficient of thermal expansion) to Al preferred (23 ppm/C), high strength and stiffness to permit thin walls to reduce parasitic conduction and mass, high formability, low density envelope preferred but not required as this is not strongly leveraged since heat pipe extrusions can be made quite thin and the BRHPN heat pipes can be kept short as they are connecting heat pipes rather than transport heat pipes. Heat pipe fluid is selected base upon several criteria: high capillary figure of merit (FOM) fluid preferred (not critical since the application uses short pipes), high gas control sensitivity factor (which determines how well the fluid responds to changes in temperature, providing more control), and low vapor pressure to permit thinner envelope walls which reduces back conduction and mass (though this is a minor consideration given the good strength of available envelope materials and small size of the heat pipe bore).

Al—NH3 is the default envelope-fluid pair in use in spacecraft heat pipes today. It is very common and widely accepted. It is light, has good thermal conduction, and is perfectly CTE matched to Al spacecraft. However, ammonia's gas control sensitivity factor is not especially good and the high thermal conductivity of Al means that significant parasitic conduction can happen.

SS-NH3 is less common, but used. Stainless steel is lower thermal conductivity which permits lower low conductance values but also decreases highest high conductance values as compared to Al. SS is also heavier than Al. It has a −65 to 90 C operating range.

Al-toluene has some use, but not especially frequently. Toluene has good gas sensitivity which means it permits shorter reservoirs and/or needs less extreme reservoir temperatures to provide control. Toluene has lower capillary transport capacity compared to ammonia which will drive more/bigger heat pipes in the BRHPN for a given max heat transport requirement, particularly if the BRHPN is called upon to move heat over significant distances. This pairing has a −50 to 280° C. operating range.

SS-toluene may have some use. This pair has the same pros/cons of SS and toluene as compared to their Al—NH3 counterpart, as previously described.

The proper pairing(s) depends primarily on two factors: first, whether achieving good high end conductance is more important or achieving good low end conductance is important. If good high end conductance is more important, then choose aluminum, otherwise choose stainless steel. Second, consider whether it is more important to keep reservoirs small or whether it is more important to transport heat over long distances. If it is more important to keep reservoirs small, then pick toluene for its better gas sensitivity factor. If heat must be transported over long distances then pick ammonia.

If a single preferred embodiment must be chosen, then Al—NH3 is recommended due to its familiarity to heat pipe manufacturers, spacecraft manufacturers, and spacecraft operators.

Other fluids and envelopes can be chosen, these 4 pairs are proffered as feasible, known pairings. Certainly more exotic combinations could be considered for unusual cases.

Different heat pipes in the BRHPN may use different fluid-envelope pairs—for example, high conductance may be more important on the CEVCHP which is responsible for releasing internally generated heat whereas the WEVCHP may only need to let in a bit of environmental heat. In this situation, a higher performance fluid like ammonia may be desirable on the CEVCHP whereas a higher gas sensitivity factor fluid like toluene may be attractive on the WEVCHP to reduce its size.

More than one of each component may be used, if needed. For example, if additional heat transfer out of the payload is needed, either more or larger CEVCHPs may be used. Similar arguments may be applied to the other components.

The wicks of the heat pipes may be sintered metal, screen, or groove wick. Groove wicks are most commonly used today due to their simplicity and robustness and are thus the preferred embodiment here, but nothing inhibits the use of another wick type in any of the heat pipes discussed here.

Other details about how to manufacture and use BRHPN are similar to other heat pipes such as axial groove heat pipes (AGHPs) and VCHPs and will be familiar to those skilled in the art of those heat pipes. Such issues include management of unintended NCG generation over life, liquid fill fraction, et cetera.

A BRHPN is a combination of variable conductance heat pipes, diode heat pipes, and thermal energy storage units for space applications. Its manufacturing process closely follows the established processes for these existing technologies which is familiar to those skilled in the art.

The assembly of these component technologies into the BRHPN is novel in the sense of how the technologies are arranged to work together to create a new capability, but the physical processes by which they are attached are familiar to those skilled in the art. A thermal interface material (TIM) is interposed between the various objects (radiator, payload, DHP, WEVCHP, CEVCHP, and TESU) such that a good heat transfer path is created amongst the various items. Heaters and temp sensors are integrated onto the hardware either before or after the components are assembled. Sub-scale thermal testing of the BRHPN assembly is strongly recommended prior to integrating the assembly on the spacecraft, at least for the first build in a series and/or the first few builds of BRHPN overall. If the overall spacecraft assembly process does not permit the BRHPN's payload to be integrated with the BRHPN's thermal elements prior to integration with the overall spacecraft, then careful qualification testing is recommended to insure that no surprises happen during spacecraft assembly and test.

Test and Operation is as follows.

BRHPN Ground Test include (1) Vibration test and (1) Performance tests, including (a) Transport capacity-adjust height and extrapolate to flat (0-g) performance, (b) Thermal conductance, (c) Test each of the 6 operating modes, and (d) Test transitions between operating modes, and (4) a Life test.

Assembly, Integration, and System Test include (1) Attach to subassembly by adhesive or bolts, including thermal interface material, as needed, and (2) Spacecraft Thermal Vacuum Test-ideally, a BRHPN should be operated with all of the BRHPN heat pipes in-plane with gravity. This means that the BRHPN should be bent into a flat configuration (i.e. no 3D heat pipes) and each heat pipe in-plane with the rest. Bottom-heated orientations may be operable in ground-testing (in which case the gas would float to the top) but thermal conductance will be different, variable conductance behavior will likely be different, and hot-environment shut-down will be impossible. Bottom-heating can be attained by orienting the two VCHPs at canted angles such that the reservoirs are slightly elevated during test. Accordingly, a fully flat orientation is the preferred way to ground-test the BRHPN to demonstrate all capabilities. The BRHPN heat pipes should be flat to within a small fraction of an inch.

Launch, Stowed, Deployment—No requirements: similar robustness to spin rates and other body forces as typical AGHPs.

Operation—the BRHPN operates as described earlier, with no special requirements imposed on the rest of the spacecraft. Fifteen plus years of unmaintained life is easily possible for properly cleaned and built BRHPNs.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A spacecraft payload temperature regulating system comprising:

a payload having a first thermal interface surface and a second thermal interface surface;

a cool environment variable conductance heat pipe having an evaporator thermally connected to the payload first thermal surface and having a condenser thermally connected to environment-coupled hardware through a diode heat pipe, wherein the diode heat pipe has a liquid trap, the cool environment variable conductance heat pipe further comprising a noncondensable gas slug in a cold end of the cool environment variable conductance heat pipe, and a noncondensable gas reservoir including a heater;

a warm environment variable conductance heat pipe having a condenser thermally connected to the payload second thermal surface and having an evaporator thermally connected to the environmental-coupled hardware, wherein the warm environment variable conductance heat pipe further comprises a heater;

a payload temperature sensor; and an ECHW temperature sensor;

wherein signals from the payload temperature sensor and from the ECHW temperature sensor are provided to a control software that, when needed, powers either the WEVCHP heater or the cool environment variable conductance heat pipe noncondensable gas reservoir heater.

2. The spacecraft payload temperature regulating system of claim 1 further comprising a thermal energy storage unit thermally connected to a payload third thermal interface surface.

3. The spacecraft payload temperature regulating system of claim 2, wherein the thermal energy storage unit is selected from a group consisting of phase change materials, simple thermal capacitors, and the payload.

4. The spacecraft payload temperature regulating system of claim 2, wherein the control software using a control logic selected from the group consisting of bang-bang, proportional and proportional/integral/derivative.

5. The spacecraft payload temperature regulating system of claim 2, wherein the diode heat pipe is selected from a group consisting of liquid trap diode heat pipes and gas reservoir diode heat pipes.

6. The spacecraft payload temperature regulating system of claim 1 wherein the cool environment variable conductance heat pipe comprises an envelope material, a wick and a heat pipe fluid.

7. The spacecraft payload temperature regulating system of claim 6 wherein the cool environment variable conductance heat pipe envelope material is selected from a group consisting of aluminum and stainless steel.

8. The spacecraft payload temperature regulating system of claim 7, wherein the cool environment variable conductance heat pipe wick is selected from a group consisting of sintered metal, screen and groove wick.

9. The spacecraft payload temperature regulating system of claim 8, wherein the cool environment variable conductance heat pipe heat pipe fluid is selected from a group consisting of NH3 and toluene.

10. The spacecraft payload temperature regulating system of claim 1 wherein the warm environment variable conductance heat pipe1 comprises an envelope material, a wick and a heat pipe fluid.

11. The spacecraft payload temperature regulating system of claim 10, wherein the warm environment variable conductance heat pipe envelope material is selected from the group consisting of aluminum and stainless steel.

12. The spacecraft payload temperature regulating system of claim 11, wherein the warm environment variable conductance heat pipe wick is selected from a group consisting of sintered metal, screen and groove wick.

13. The spacecraft payload temperature regulating system of claim 12, wherein the warm environment variable conductance heat pipe1 heat pipe fluid is selected from a group consisting of NH3 and toluene.

14. The spacecraft payload temperature regulating system of claim 1, wherein at least one cold environment variable conductance heat pipes are thermally connected to the first thermal surface of the payload and the environmental-coupled hardware.

15. The spacecraft payload temperature regulating system of claim 1, wherein at least one warm environment variable conductance heat pipes are thermally connected to the second thermal surface of the payload and the environmental-coupled hardware.

* * * * *